United States Patent
Collazo et al.

(10) Patent No.: US 6,937,185 B1
(45) Date of Patent: Aug. 30, 2005

(54) RAIN VERSUS TARGET DISCRIMINATION FOR DOPPLER RADARS

(75) Inventors: Ivan Collazo, Orlando, FL (US); Donald D. Dean, Orlando, FL (US)

(73) Assignee: Lockheed Martin Corporation, Bethesda, MD (US)

(*) Notice: Subject to any disclaimer, the term of this patent is extended or adjusted under 35 U.S.C. 154(b) by 120 days.

(21) Appl. No.: 10/641,977

(22) Filed: Aug. 14, 2003

(51) Int. Cl.[7] ............................................. G01S 13/18
(52) U.S. Cl. ....................... 342/159; 342/160; 342/161; 342/195; 342/196
(58) Field of Search .................. 342/25 R, 94, 342/159–161, 118, 191, 192, 195–196

(56) References Cited

U.S. PATENT DOCUMENTS

| | | | | |
|---|---|---|---|---|
| 4,275,396 A | * | 6/1981 | Jacomini | 342/93 |
| 4,684,950 A | * | 8/1987 | Long | 342/94 |
| 4,709,236 A | * | 11/1987 | Taylor, Jr. | 342/101 |
| 4,713,664 A | * | 12/1987 | Taylor, Jr. | 342/91 |
| 4,811,020 A | * | 3/1989 | Montheil | 342/159 |
| 5,485,157 A | * | 1/1996 | Long | 342/160 |
| 5,990,824 A | * | 11/1999 | Harrison | 342/160 |
| 6,809,682 B1 | * | 10/2004 | Madewell | 342/160 |
| 2004/0056794 A1 | * | 3/2004 | Erkocevic-Pribic | 342/196 |

* cited by examiner

*Primary Examiner*—Thomas H. Tarcza
*Assistant Examiner*—Isam Alsomiri
(74) *Attorney, Agent, or Firm*—Jeffrey D. Meyers; Peacock Myers & Adams, PC

(57) ABSTRACT

A method of removing returns from rain in Doppler radar systems (and corresponding apparatus and computer software) comprising receiving a Doppler radar return signal, transforming the signal into a range versus frequency map, for a plurality of range cells, performing a fit over frequency, for the plurality of range cells, calculating a total energy, for the plurality of range cells, comparing the calculated total energy to a threshold value, and replacing the return signal for a range cell with another signal if for the plurality of range cells the comparing step is positive.

33 Claims, 6 Drawing Sheets

RAIN VERSUS TARGET DISCRIMINATION FOR DOPPLER RADARS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

© 2003 Lockheed Martin Corporation. A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to methods, software, and apparatuses for distinguishing between rain and potential targets in Doppler radar systems.

2. Description of Related Art

Rain return obscures Doppler radar screen and airborne target detection by increasing the number of false targets detected. For example, a serious problem with Fire Control Radar is in experiencing an increase in false target (e.g., helicopter) detections in severe wind driven rain. Returns from rain are similar to those from true targets in width, shape, and frequency. Typical Constant False Alarm Rate (CFAR) processing has attempted to discriminate against rain and targets with a series of thresholds operating upon the radar information (including the rain energy). With this limitation the demands upon the CFAR to maintain a fixed false alarm rate requires more stringent thresholds thus reducing the detection capability of the system.

The present invention provides an advanced digital signal processing method, apparatus, and software to effectively remove/filter rain energy/signal from the radar data utilizing the logic of recognizing the extent of rain in both range and Doppler (as compared to the limited extent of a airborne target), and substituting with thermal noise. This allows the subsequent classical CFAR processing to operate with lower thresholds (increasing target detectability) while maintaining the required false alarm rate. Targets can then be detected as easily in rain as in clear conditions. A technique of this type is novel in that, among other considerations, the rain energy is actually removed from the radar data enabling subsequent detection processing to be performed without rain considerations.

BRIEF SUMMARY OF THE INVENTION

The present invention is of a method of removing returns from rain in Doppler radar systems, comprising: receiving a Doppler radar return signal; transforming the signal into a range versus frequency map; for a plurality of range cells, performing a fit over frequency, for the plurality of range cells, calculating a total energy; for the plurality of range cells, comparing the calculated total energy to a threshold value; and replacing the return signal for a range cell with another signal if for the plurality of range cells the comparing step is positive. In the preferred embodiment, the plurality of range cells are adjacent and comprise at least three. In the replacing step, the other signal is a noise signal, preferably statistically similar to an average energy proximate the plurality of range cells. Transforming step comprises performing a Fast Fourier Transform. The method is preferably implemented in a system selected from military targeting systems, helicopter identification systems, and airport aircraft location systems. Performing a fit preferably comprises performing a least squares fit, more preferably a parabolic least squares fit, and most preferably a parabolic Gaussian weighted least squares fit. The invention preferably additionally comprises averaging frequency data across the plurality of range cells prior to performing a fit, most preferably via a non-weighted running carriage integral method. Calculating comprises integrating a power spectrum, preferably calculating signal power and noise power simultaneously. In the comparing step the threshold value is preferably predetermined, most preferably being approximately 14 dB.

The invention is also of an apparatus for removing returns from rain in Doppler radar systems, comprising: means for receiving a Doppler radar return signal, means for transforming the signal into a range versus frequency map; for a plurality of range cells, means for performing a fit over frequency; for the plurality of range cells, means for calculating a total energy; for the plurality of range cells, means for comparing the calculated total energy to a threshold value; and means for replacing the return signal for a range cell with another signal if for the plurality of range cells results of comparing are positive. In the preferred embodiment, the various means function as in the method description just above.

The invention is further of computer software for removing returns from rain in Doppler radar systems, comprising: means for transforming a Doppler radar return signal into a range versus frequency map; for a plurality of range cells, means for performing a fit over frequency; for the plurality of range cells, means for calculating a total energy; for the plurality of range cells, means for comparing the calculated total energy to a threshold value; and means for replacing the return signal for a range cell with another signal if for the plurality of range cells results of comparing are positive. In the preferred embodiment, the various means function as in the method description just above.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
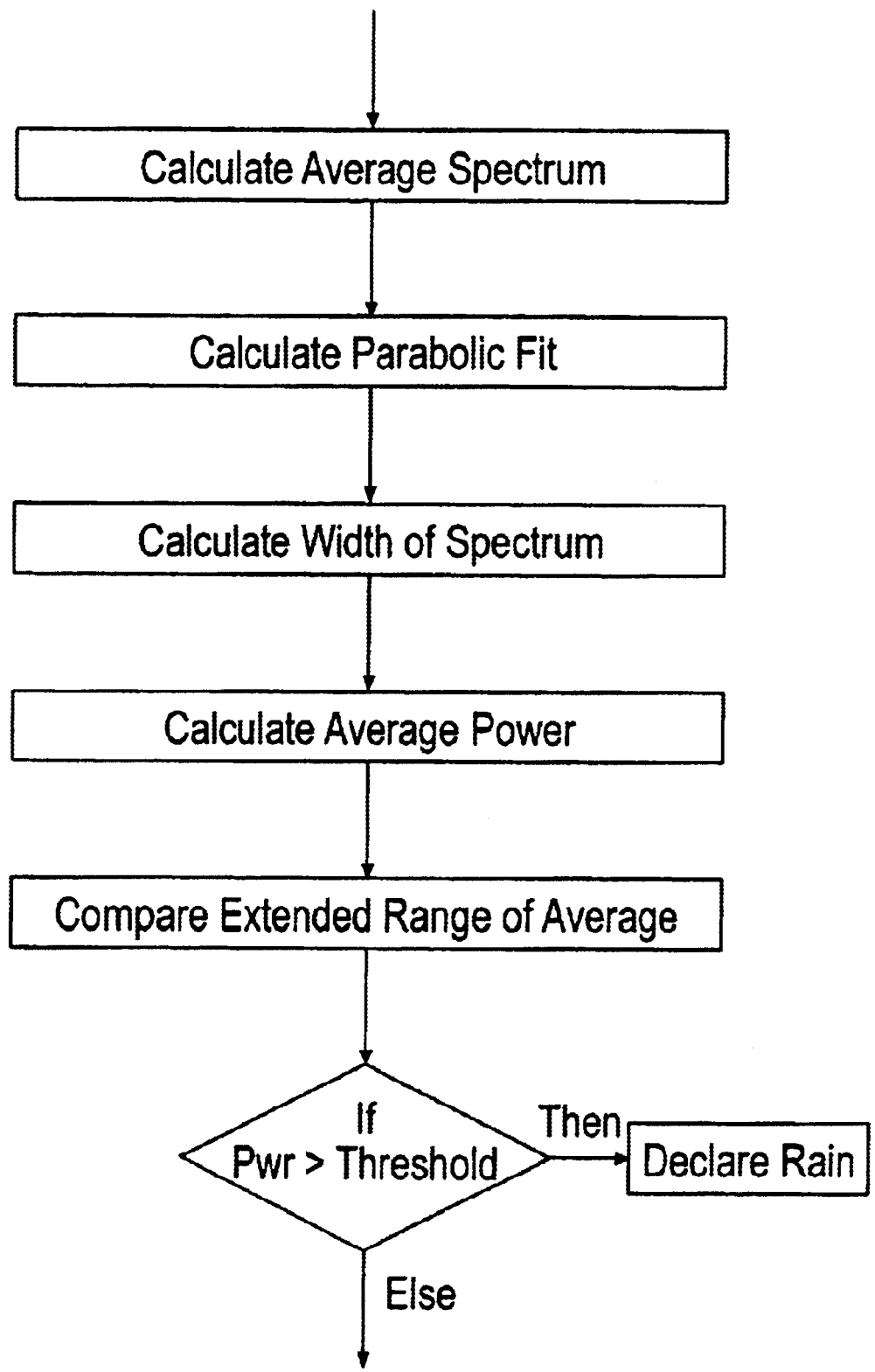
FIG. 1 is top level flow chart of the method of the invention.

The present invention is of a method, software, and apparatus for better discriminating targets in rain conditions. The rain rejection aspect of the invention detects the rain energy based upon range extent and frequency characteristics. Upon detection the rain reflected spectral power is removed from the range-frequency map (replaced by thermal noise), thus greatly reducing the false alarms associated with the rain signal. The range-frequency map is calculated from the radar data, after which a Gaussian Weighted Parabolic Least Square Fit is applied to the data within each range cell. The energy under the fit is compared to a threshold to determine detection in that range gate. If there are contiguous detections in range, the data under the fit is declared rain and substituted with thermal noise. Subsequent conventional CFAR processing proceeds in the new "clear" data environment.

In the preferred embodiment, the radar signal is Fast Fourier Transformed (FFT) to obtain a range versus frequency map. The presence of rain is detected in the Range-Doppler map by using its extension over range and frequency. A parabolic least square fit over frequency is used to calculate the width of the rain in Doppler space. Using this width the total energy within the rain spectrum is calculated and compared to a threshold related to energy in the spectrum not occupied by rain or mainlobe clutter. This calculation is performed on the range cell under test and a cell prior to and after (with a guard band cell(s) between). If the threshold is exceeded by the range cell under test and either prior or after range cells the logic declares rain present and the Doppler filters corresponding to the rain energy are replaced with random "noise" with statistics similar to the average energy around that range gate excluding the region occupied by main-lobe clutter. This results in the elimination of the rain energy/signal from the Range-Doppler map. Subsequent classical Constant False Alarm (CFAR) processing can now be performed on the rain free Range-Doppler map.

The invention is next discussed in an embodiment in which helicopters are one of the targets of concern. It has been noticed during field test that high rain rates conditions produce an undesired high amount of helicopter false alarms. This is mainly because of the similarities between the helicopter's and the rain's frequency spectrums. The helicopter's hub will reflect a Doppler widened frequency spectrum, while the rain will reflect a similarly wide frequency spectrum. Since rain is not stationary in nature, the frequency spectrum of the rain will show an average Doppler shift due to the average velocity of the rain (cloud and/or wind). This will result in a radar classification of the wind driven rain as a moving helicopter from the perspective of the radar classification algorithm. Note that fixed wing aircraft do not show as great a spread in their frequency spectrum.

Since both helicopters and rain have similar frequency spectrums (similar in spectral width and Doppler shift), other features need to be considered in order to discriminate between them and reject rain. The first property considered was the volume extension of the rain as compared to a helicopter. Modern day helicopters do not extend more that two (2) cells in the radar range gates, while rain can easily extend much more than that. By looking at the rain/target extension over range it is possible to make an educated guess of what is a real target (of limited size) and what is rain.

The preferred embodiment of the present invention looks at the range extension of the reflected signal and rejects all targets that extend over three (3) cells or more. Modern day helicopters are not larger than the size of two (2) range gate cells. Thus, targets that occupy one or two cells can be considered real targets, while targets that extend over three (3) or more range gate cells cannot be considered to be real targets. A top-level flow chart is shown in FIG. 1.

As mentioned above, the reason for the characterization of rain as helicopters by the classification algorithm is the strong similarity of the frequency spectrums between helicopters and rain. One method considered to reject rain is the use of the extension of the rain signal over range. This simplistic and obvious method to the human eye is described next. Some data analysis and processing liberties where taken and will be described in detail.

Figure 2:
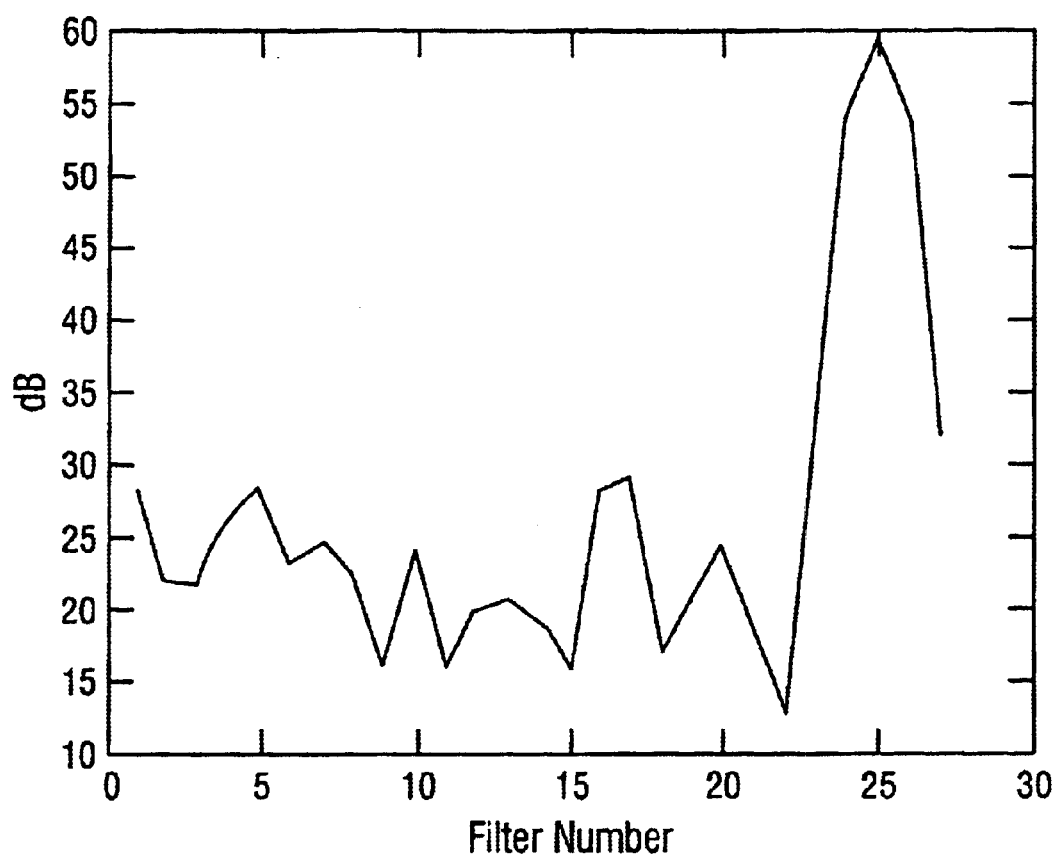
FIG. 2 is a frequency spectrum of a target signal.
Figure 3:
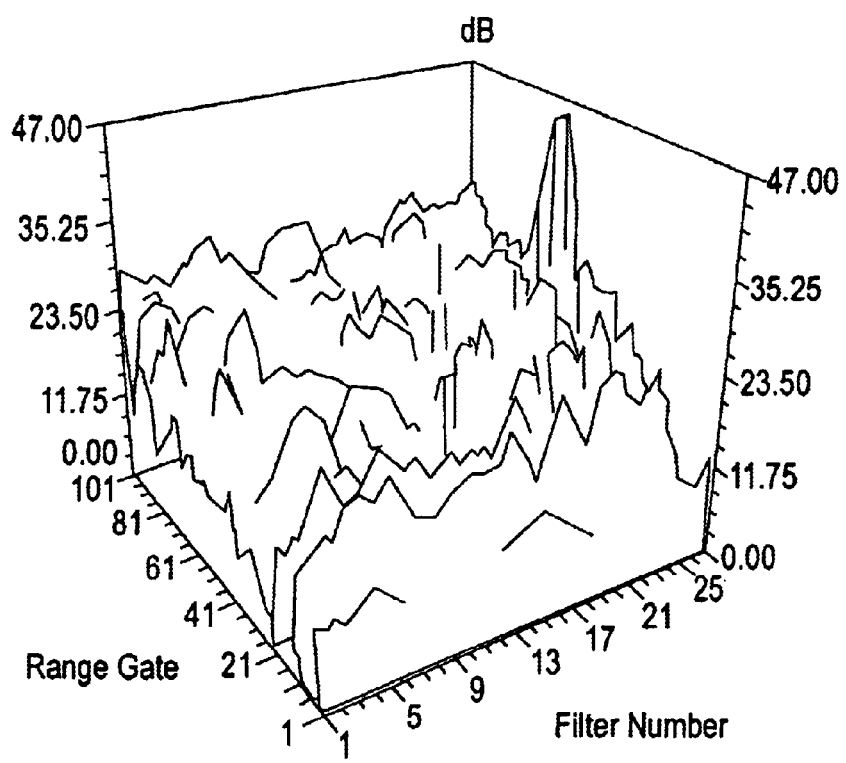
FIG. 3 is a target frequency spectrum for range gates 1 to 101 versus filter number.

The data consist of a series of 32 pulses in time space. These 32 points are Fast Fourier Transformed to frequency space, giving the frequency spectrum of the signal for a specific range gate cell. FIG. 2 shows the FFT for one of such range gate cell data for a clear target in a good day. A few things can be said from this plot without loss of generality. First, there is a noise floor around the 20 dB line. Second, aside from the noise floor, the signal has a Gaussian shape. Third, the points that fall in the Gaussian curve only give a coarse representation of the Gaussian. FIG. 3 shows the target signal in perspective with all the other range gates. The target signal stands clear above the noise floor for a clear and unmistakable detection.

Figure 4:
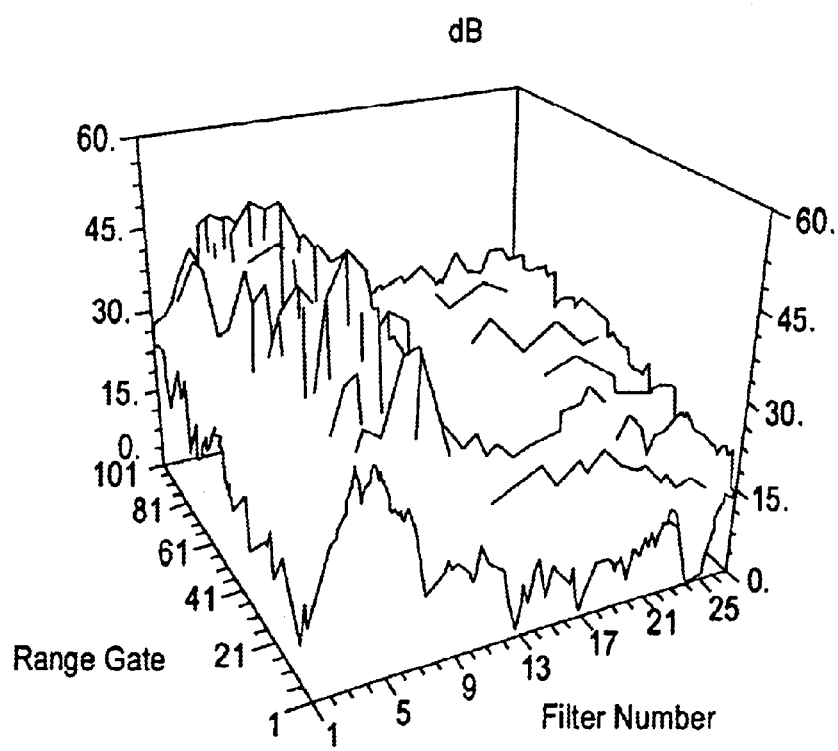
FIG. 4 is a rain frequency spectrum for range gates 1 to 101 versus filter number.

Data from a rainy day is shown in FIG. 4. Like before, a few things can be noticed in comparison with the data from a clear day. There is a clear noise floor. Above the noise floor stands the Doppler signal from the rain. It has a width comparable to the one from the helicopter in a clear day. There is an average Doppler shift due to the rain's average velocity. Finally, the Doppler signal is nearly constant over the entire range where there is rain.

While it is easy for the human eye and mind to discriminate between rain and target from the plots above, it is a more involved process to automatically do so via software and/or hardware apparatus, and how the invention accomplishes this is next discussed.

Figure 5:
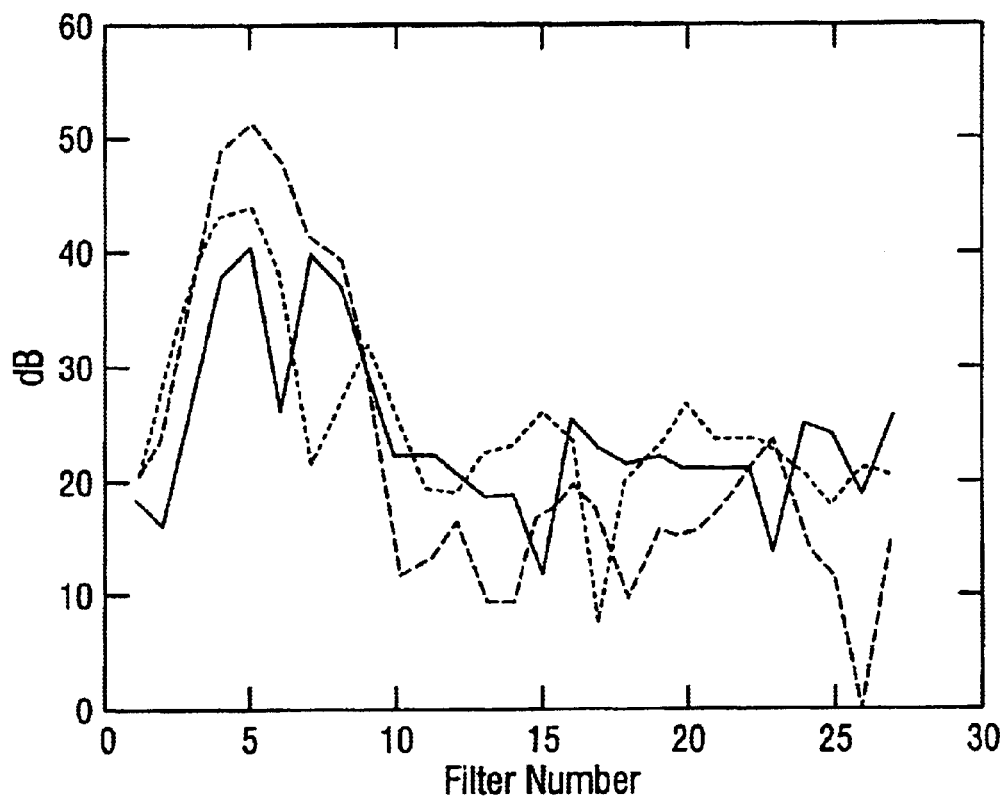
FIG. 5 is a frequency spectrum for three (3) adjacent range gate cells.

As mentioned before, the spectrum data will be inherently noisy, both on the filter number axis and the range gate axis. FIG. 5 shows the frequency spectrum for three (3) adjacent range gates. It can be seen from FIG. 5 that even for adjacent range gates the maximum amplitude, shape, and width of the Gaussian can change significantly for the rain data. This noise is mainly due to the turbulent nature of the wind in the rainstorm. When the winds inside a range cell move all in the same direction we can expect to get a return signal that will look very much like a Gaussian, as curve 10 in FIG. 5. Since the wind will not go forever in the same direction, eventually it will start turning around to make a "micro tornado". This will give a return signal like curve 12 in FIG. 5. Finally, once the wind is moving in a circular motion to make a well defined "micro tornado", the circular moving winds will return a signal like curve 14 in FIG. 5.

To improve the detection and rejection capabilities, an averaging over range gates cells is preferably implemented in the invention. While not strictly necessary, this step greatly improves the quality and noisiness of the data. The preferred method is a standard non-weighted running carriage integral method. This averaging will result in the set of "n" points to be used for the parabolic fit, described next.

The method preferably used for the parabolic fit is a Parabolic Gaussian Weighted Least Square Fit. The use of a Gaussian weighting function allows one to give more importance to the points at the center of the interval, thereby minimizing the fitting error at the center points of the parabolic fit at the expense of the match at the extremes of the parabola.

The procedure starts with the set of "N+1" points, $(x_k, y_k)$, for $0 \leq k \leq N$. Then the error can be defined as:

$$E = \frac{1}{N} \sum_{k=0}^{N} w_k^2 \cdot (c + bx_k + ax_k^2 - y_k)^2$$

Where a, b, and c are the parabolic fit coefficients to the data points, $(x_k, y_k)$ are the data points, and the factor $w_k^2$ is the Gaussian weighting factor $$\left( \text{normalized, i.e., } \sum_{k=0}^{N} w_k^2 = 1 \right).$$

To find the best fit, one minimizes the error, E, as a function of the fitting parameters (a, b, and c). The standard way to solve for the parabolic fit coefficients is to differentiate with respect to a, b, and c. Set the derivatives to 0 and solve the system of linear equations, as shown below:

$$\frac{\partial E}{\partial c} = \frac{\partial}{\partial c} \left( \frac{1}{N} \sum_{k=0}^{N} w_k^2 \cdot (c + bx_k + ax_k^2 - y_k)^2 \right) = 0$$

$$\frac{\partial E}{\partial b} = \frac{\partial}{\partial b} \left( \frac{1}{N} \sum_{k=0}^{N} w_k^2 \cdot (c + bx_k + ax_k^2 - y_k)^2 \right) = 0$$

$$\frac{\partial E}{\partial a} = \frac{\partial}{\partial a} \left( \frac{1}{N} \sum_{k=0}^{N} w_k^2 \cdot (c + bx_k + ax_k^2 - y_k)^2 \right) = 0$$

Taking the partial derivative inside the parenthesis and factorizing, one gets:

$$\frac{2}{N} \sum_{k=0}^{N} w_k^2 \cdot (c + bx_k + ax_k^2 - y_k) \cdot 1 = 0$$

$$\frac{2}{N} \sum_{k=0}^{N} w_k^2 \cdot (c + bx_k + ax_k^2 - y_k) \cdot x_k = 0$$

$$\frac{2}{N} \sum_{k=0}^{N} w_k^2 \cdot (c + bx_k + ax_k^2 - y_k) \cdot x_k^2 = 0$$

Distributing the factor into the parenthesis, one gets:

$$\frac{2}{N} \sum_{k=0}^{N} w_k^2 \cdot (c + bx_k + ax_k^2 - y_k) = 0$$

$$\frac{2}{N} \sum_{k=0}^{N} w_k^2 \cdot (cx_k + bx_k^2 + ax_k^3 - y_k x_k) = 0$$

$$\frac{2}{N} \sum_{k=0}^{N} w_k^2 \cdot (cx_k^2 + bx_k^3 + ax_k^4 - y_k x_k^2) = 0$$

Next one cancels the 2/N factor, distribute the sum, and rearrange the terms, as:

$$\sum_{k=0}^{N} w_k^2 \cdot c + \sum_{k=0}^{N} w_k^2 \cdot bx_k + \sum_{k=0}^{N} w_k^2 \cdot ax_k^2 = \sum_{k=0}^{N} w_k^2 \cdot y_k$$

$$\sum_{k=0}^{N} w_k^2 \cdot cx_k + \sum_{k=0}^{N} w_k^2 \cdot bx_k^2 + \sum_{k=0}^{N} w_k^2 \cdot ax_k^3 = \sum_{k=0}^{N} w_k^2 \cdot y_k x_k$$

$$\sum_{k=0}^{N} w_k^2 \cdot cx_k^2 + \sum_{k=0}^{N} w_k^2 \cdot bx_k^3 + \sum_{k=0}^{N} w_k^2 \cdot ax_k^4 = \sum_{k=0}^{N} w_k^2 \cdot y_k x_k^2$$

Factorize the parabolic coefficients constants:

$$c \sum_{k=0}^{N} w_k^2 + b \sum_{k=0}^{N} w_k^2 \cdot x_k + a \sum_{k=0}^{N} w_k^2 \cdot x_k^2 = \sum_{k=0}^{N} w_k^2 \cdot y_k$$

$$c \sum_{k=0}^{N} w_k^2 \cdot x_k + b \sum_{k=0}^{N} w_k^2 \cdot x_k^2 + a \sum_{k=0}^{N} w_k^2 \cdot x_k^3 = \sum_{k=0}^{N} w_k^2 \cdot y_k x_k$$

$$c \sum_{k=0}^{N} w_k^2 \cdot x_k^2 + b \sum_{k=0}^{N} w_k^2 \cdot x_k^3 + a \sum_{k=0}^{N} w_k^2 \cdot x_k^4 = \sum_{k=0}^{N} w_k^2 \cdot y_k x_k^2$$

Once in this form, the equations can easily be put into matrix form, as:

$$\begin{pmatrix} \sum_{k=0}^{N} w_k^2 \cdot x_k^0 & \sum_{k=0}^{N} w_k^2 \cdot x_k^1 & \sum_{k=0}^{N} w_k^2 \cdot x_k^2 \\ \sum_{k=0}^{N} w_k^2 \cdot x_k^1 & \sum_{k=0}^{N} w_k^2 \cdot x_k^2 & \sum_{k=0}^{N} w_k^2 \cdot x_k^3 \\ \sum_{k=0}^{N} w_k^2 \cdot x_k^2 & \sum_{k=0}^{N} w_k^2 \cdot x_k^3 & \sum_{k=0}^{N} w_k^2 \cdot x_k^4 \end{pmatrix} \cdot \begin{pmatrix} c \\ b \\ a \end{pmatrix} = \begin{pmatrix} \sum_{k=0}^{N} w_k^2 \cdot y_k x_k^0 \\ \sum_{k=0}^{N} w_k^2 \cdot y_k x_k^1 \\ \sum_{k=0}^{N} w_k^2 \cdot y_k x_k^2 \end{pmatrix}$$

Now to solve for the parabolic fit coefficients (a, b, and c), we multiply by the inverse of the matrix, $$m_{ij} = \sum_{k=0}^{N} w_k^2 \cdot x_k^{i+j},$$

with $0 \leq i \leq 2$ and $0 \leq j \leq 2$, to obtain:

$$\begin{pmatrix} \sum_{k=0}^{N} w_k^2 \cdot x_k^0 & \sum_{k=0}^{N} w_k^2 \cdot x_k^1 & \sum_{k=0}^{N} w_k^2 \cdot x_k^2 \\ \sum_{k=0}^{N} w_k^2 \cdot x_k^1 & \sum_{k=0}^{N} w_k^2 \cdot x_k^2 & \sum_{k=0}^{N} w_k^2 \cdot x_k^3 \\ \sum_{k=0}^{N} w_k^2 \cdot x_k^2 & \sum_{k=0}^{N} w_k^2 \cdot x_k^3 & \sum_{k=0}^{N} w_k^2 \cdot x_k^4 \end{pmatrix}^{-1} \begin{pmatrix} \sum_{k=0}^{N} w_k^2 \cdot y_k x_k^0 \\ \sum_{k=0}^{N} w_k^2 \cdot y_k x_k^1 \\ \sum_{k=0}^{N} w_k^2 \cdot y_k x_k^2 \end{pmatrix} = \begin{pmatrix} c \\ b \\ a \end{pmatrix}$$

Which readily gives the values for the parabolic fit coefficients.

Two things can be noticed from this matrix form solution. First, the matrix and its inverse matrix are symmetric and only depend on the $x_k$ values. For equally spaced points in the dimensionless frequency spectrum space, it can be assumed without lost of generality that $x_k = k$, and the matrix and its inverse are easily calculated for any given number of points "N", independent of the frequency interval and the data points. Second, the vector $$v_j = \sum_{k=0}^{N} w_k^2 \cdot y_k \cdot x_k^j,$$

where $0 \leq j \leq 2$, is the only element of the equations that uses the y-axis values of the data points. This preferably is used to minimize the execution time of the procedure of the invention.

Figure 6:
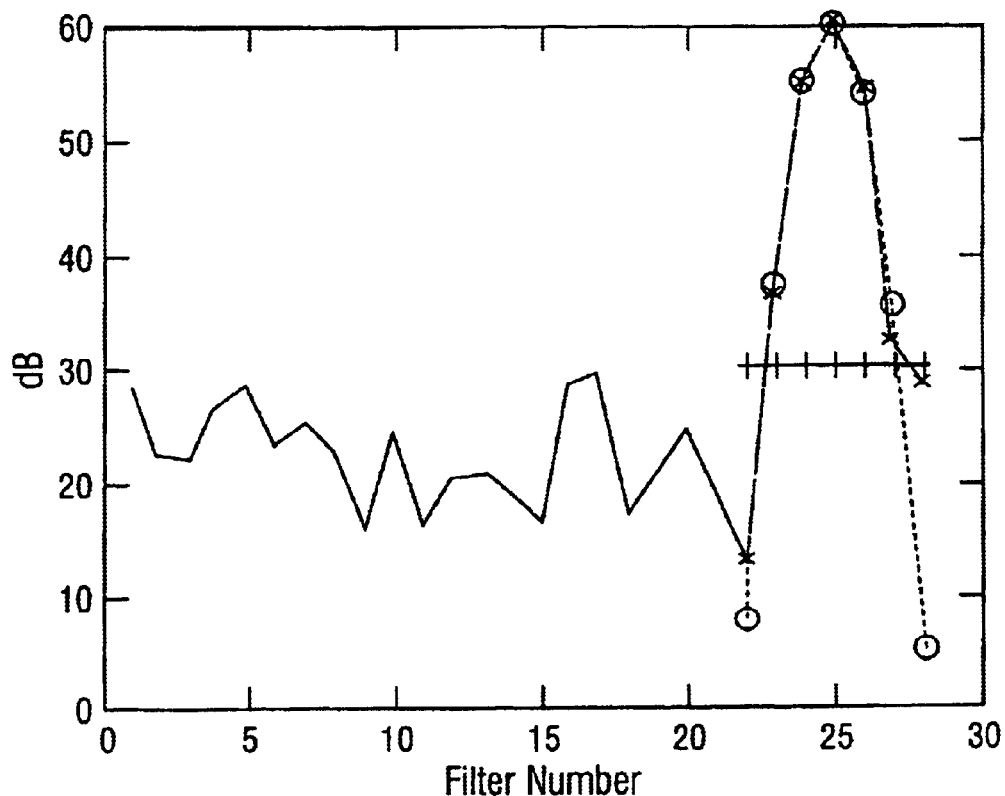
FIG. 6 is a target frequency spectrum with parabolic fit.

An example of the parabolic fit derived above is presented in FIG. 6. The plot shows the noise floor 16. The data interval used for the Parabolic Gaussian Weighted Least Square fit 18 is shown with the data points marked with "x". The parabolic fit is the smooth curve 20 with the corresponding data points marked with "o". The full width is the line 22 with "+". As mentioned above, the Gaussian Weighting function provided with a parabolic fit that minimizes that error at the center of the parabola at the expense of the error at the ends of the parabola. This is a better and more accurate fit since the relative error of the signal is lesser around the maximum of the signal that at its ends. The Gaussian effect on the fit can be seen on the plot of FIG. 6. Notice how the "o" from the parabolic fit closely matches the "x" of the data points around the maximum, while the error between the fit and the real data is much bigger at the ends of the parabolic fit.

Once the width of the signal is known, the integration of the power spectrum can be done. This is preferably implemented such that the signal power and the noise power are calculated concurrently. Then the power in the range gate cell under consideration is compared with the power of the range gate cell before and after it. If the relative powers are within 14 dB of each other (that is about twice the average), then there is a signal of comparable magnitude in the three adjacent range gate cells and the algorithm classifies the target as rain. The data set was rolled over to take advantage of the periodic nature and properties of the FFT.

The procedure mentioned above was implemented in two (2) different platforms. The first was a MatLab code that served as a test bed for the parabolic least square fit algorithm. This MatLab code is included in Appendix A, Computer Code 1. The second was the full implementation inside the data extraction and analysis Fortran code for an Apache radar system. FIG. 6 shows an example of the output from the MatLab code. While the Fortran code does not have a graphic output, it can provide data files that can be inputted to other plotting programs as shown in FIGS. 3 and 4.

The rain rejection method of the invention was implemented in a Fortran data extraction and analysis for the Apache radar, which comprises programmable data processing means (microprocessor and associated electronics). Data with heavy rain and a helicopter in a clear day was analyzed and compared.

Figure 7:
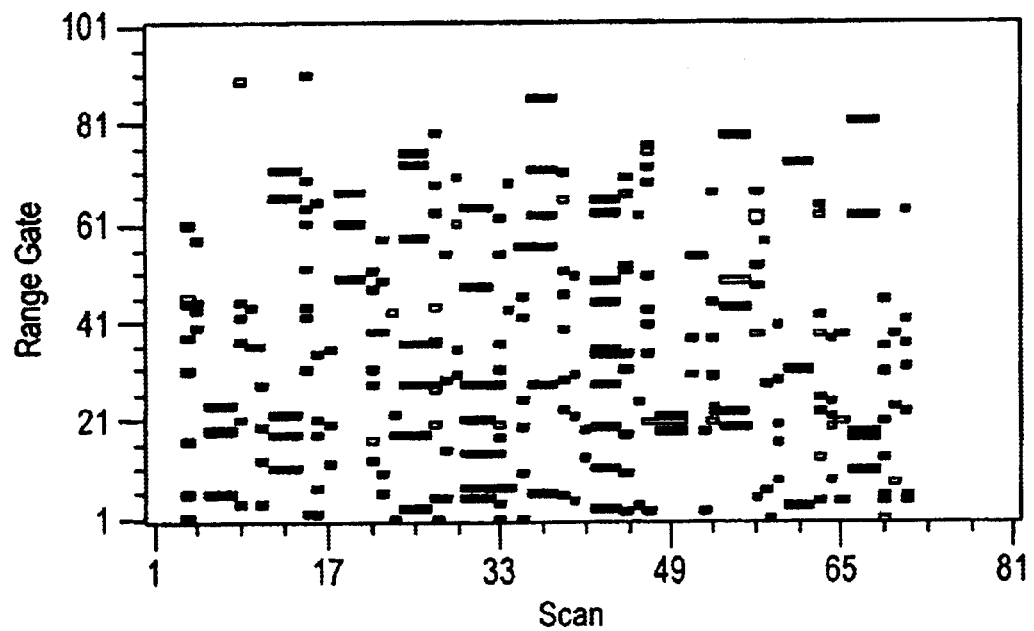
FIG. 7 is a detection report of severe rain without employing rain rejection according to the invention.
Figure 8:
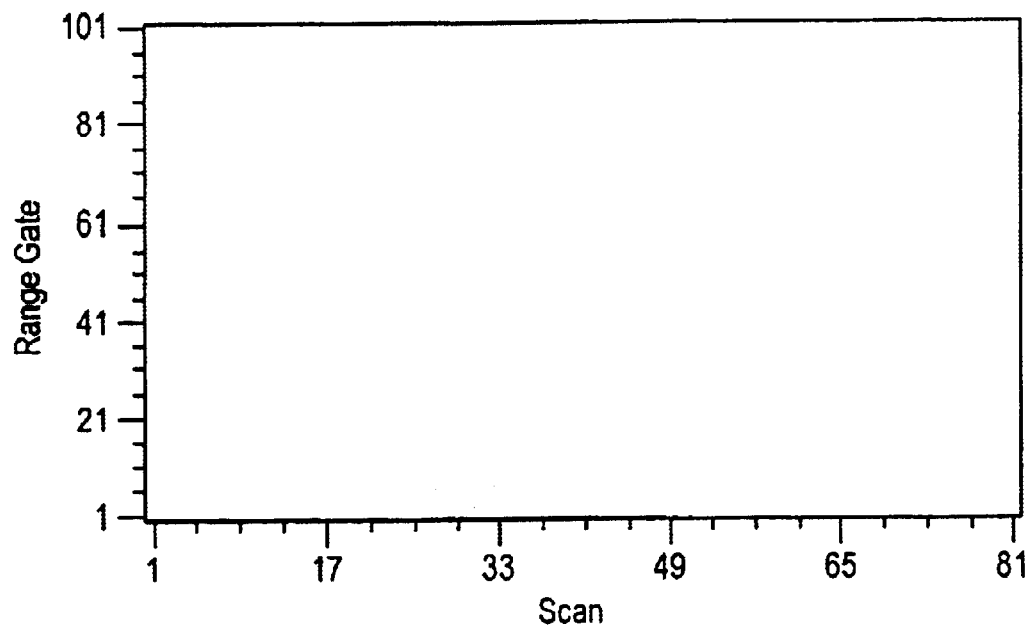
FIG. 8 is a detection report of severe rain with rain rejection according to the invention.

Radar data from severe thunderstorm was analyzed with the Fortran program. The data was analyzed without (FIG. 7) and with (FIG. 8) the rain rejection method. It can be readily noticed that the rain rejection algorithm cleared all the false target detections from the display.

Figure 9:
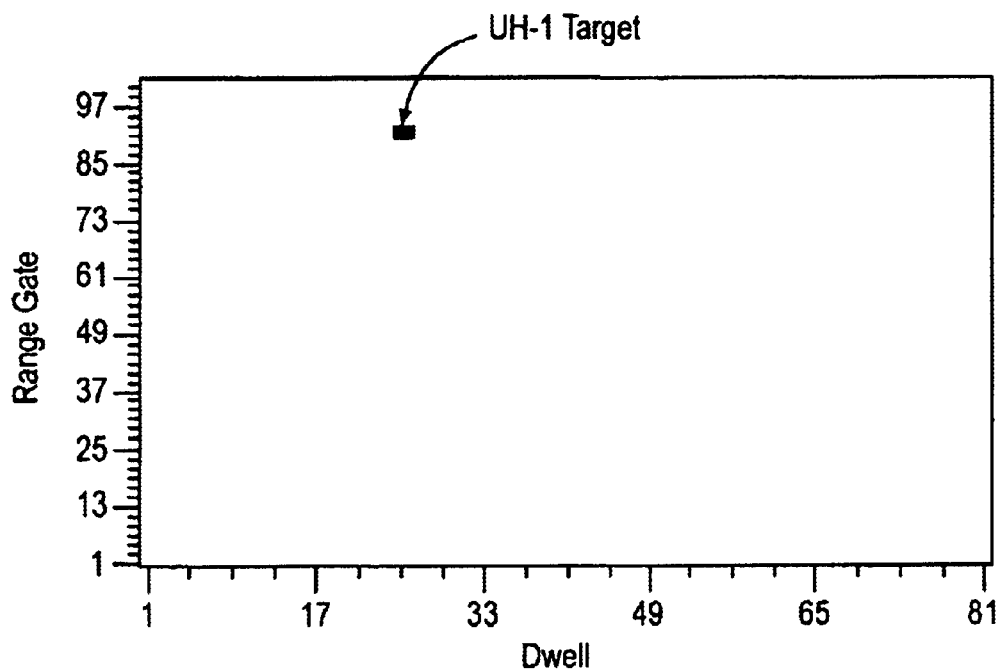
FIG. 9 is a target report of a Huey helicopter without employing rain rejection according to the invention.
Figure 10:
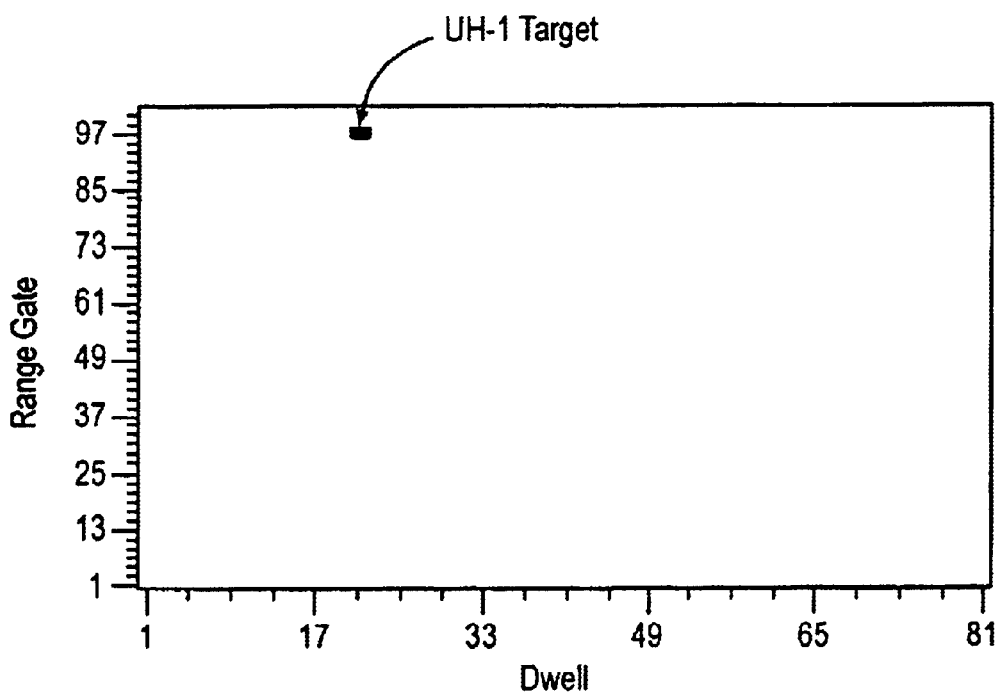
FIG. 10 is a target report of a Huey helicopter with rain rejection according to the invention.

Data with a real target during a clear day was analyzed with the program to verify that the invention will not reject real targets accidentally. Again, the data was analyzed without and with the rain rejection algorithm as shown in FIGS. 9 and 10. As expected, the invention did not classify the real target as rain.

The characteristics of the rain data for a radar signal were presented and analyzed. It was noticed that a parabola would be a good fit to these type of signals. A method to do a Parabolic Least Square fit with Gaussian Weighting was developed to model the signal from the radar. Finally, this method was implemented to differentiate between the radar signal of a target and the signal from rain, based on the range extension of the rain over range as compared with the range extension of a helicopter target. It can be concluded that the range extension algorithm is a feasible way to detect and reject rain from a real helicopter target.

The invention is useful in both military and non-military applications. For example, the invention can be employed by airport Doppler radars to better discriminate air traffic during rain conditions.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

APPENDIX

A. MatLab Modeling and Implementation Code

The Mat Lab code use for the modeling of the Parabolic Gaussian Weighted Least Square Fit is show below in Computer Code 1. The input to the code is a file with an array of 101 range gates by 32 filter numbers with the power data. After reading the array, the code strips the vector with the 32 points of data at a range gate where there is a detection of some type (rain or target). The maximum and its position are fund. The Gaussian weighting values/vector is calculated. The data around the maximum is extracted. This is done using the "modulo" function to create a wrap around ring function. The sampling matrix, $$m_{ij} = \sum_{k=0}^{N} w_k^2 \cdot x_k^{i+j},$$

where $0 \leq i \leq 2$ and $0 \leq j \leq 2$, is calculated, followed by the power vector, $$v_j = \sum_{k=0}^{N} w_k^2 \cdot y_k \cdot x_k^j.$$

Then the inverse of the sampling matrix is calculated. Finally, the power vector multiplies the inverse of the sampling matrix, and the results are plotted.

---

Computer Code 1:MatLab simulation code for the Parabolic Gaussian Weighted Least Square Fit.

```
%Gaussian Weighted Least Square Parabolic fitting to a set of N points.
close all;
clear all;
pwr = load('FFT_Pwr_dB_vs_Rg_vs_Lk_D0242L4.DAT');
pwr2 = max(0,pwr);
irg = 96;
delta_fit = 3;
xpwr = 1.27;
ypwr = pwr2(:,Irg);
[y_max,i_max] = max(ypwr);
fit_min = max(1,l_max-delta_fit-1);
fit_max = i_max+delta_fit-1;
yi = ypwr(1+mod(fit_min:fit_max,27));
iy = size(yi,1);
x = 1:ly;
ff = exp(-(4.*(x-(iy+1)/2.)/iy).^2);
ff2 = ff.*ff;
fn = ff2/sum(ff2);
xi = zeros(5,iy);
xi(1,1:iy) = ones(1,iy);
i(2,1:iy) = x;
xi(3,1:iy) = x(2,1:iy).* xi(2,1:iy);
xi(4,1:iy) = x(3,1:iy).* xi(2,1:iy);
xi(5,1:iy) = xi(4,1:iy).* xi(2,1:iy);
sxi = xi * fn
ee = zeros(3,3);
ee(1,1) = sxi(1); ee(1,2) = sxi(2); ee(1,3) = sxi(3);
ee(2,1) = sxi(2); ee(2,2) = sxi(3); ee(2,3) = sxi(4);
ee(3,1) = sxi(3); ee(3,2) = sxi(4); ee(3,3) = sxi(5);
xxi = [ xi(1,:)  ; xi(2,:)  ; xi(3,:) ];
xxn = [ xi(1,:).* fn ; xi(2,:).* fn ; xi(3,:).* fn];
yy = xxn*yi; %yy(3,N) = xxx(3,9)* yi(9,N)
a = inv(ee) * y; % a(3,N) = * yy(3,N)
pp = xxi' * a; % pp(9,N) = xxi(3,9)' * a(3,N)
xx = x + max(0,fit_min);
xp = 1+(fit_max-fit_min)*(0:40)/40;
yp = xp.*xp * a(3) + xp * a(2) + a(1);
xp = xp + max(0,fit_min);
Delta_x = (-sqrt( a(2,:).* a(2,:) - 4* a(3,:).*a(1,:))./a(3,:))';
xw = xx;
yw = ones(size(xx)) * y_max/2.;
plot(xpwr,ypwr,'g',xx,pp,'ro',xx,yi,'bx-',xp,yp,'r',xw,yw,'k-+')
```

B. FORTRAN Parabolic Fit Subroutine

The same analysis method described above was implemented in a Fortran program that analyses the radar data for the Apache Fire Control Radar. The code that does the parabolic fit to the power data is show in Computer Code 2.

---

Computer Code 2: Fortran parabolic fit subroutine.

```
REAL*4 FUNCTI9N GET_WIDTH_N(ifl,pwr_in)
IMPLICIT NONE
INTEGER*4 i,j, ifl, nfls
PARAMETER (nfls=7)
REAL*4    x(3), y(3), mantiza, y_dB(0:2*ifl), yy, pwr_in(0:2*ifl)
REAL*4    weight(0:2*nfls,nfls)
DATA      weight(0:2,1) / 0,164, 0.973, 0.164 /
DATA      weight(0:4,2) / 0.062, 0.421, 0.799, 0.421, 0.062 /
DATA      weight(0:6,3) / 0.036, 0.183, 0.487, 0.675, 0.487, 0.183,
          0.036 /
DATA      weight(0:8,4) / 0.025, 0.101, 0.270, 0.489, 0.596, 0.489,
          0.270, 0.101, 0.025 /
DATA      weight(0:10,5) /0.020, 0.065, 0.164, 0.317, 0.472, 0.539,
          0.472, 0.317,
          0.164, 0.065, 0.020 /
DATA      weight(0:12,6) /0.016, 0.046, 0.109, 0.211, 0.339, 0.451,
          0.495, 0.451, 0.339, 0.211, 0.109, 0.046, 0.016 /
DATA      weight(0:2*nfls,nfls) / 0.014, 0.036, 0.078, 0.148, 0.243,
          0.347, 0.430, 0.461, 0.430, 0.347, 0.243, 0.148, 0.078,
          0.036, 0.014 /
REAL*4    m(3,3,nfls)
DATA      m(:,:,1) / 37.007, 55,511, 18.504,
               -55.11, 96.747, -39.122,
               18.504, -39.122, 19.561 /
DATA      m(:,:,2) / 51.193, -49.241, 11.012,
               -49.241, 51.337, -12.185
               11.012, -12.185, 3.046 /
DATA      m(:,:,3) / 70.896, -46.278, 7.060
               -46.278, 32.169, -5.144,
               7,060, -5.144, 0.857 /
DATA      m(:,:,4) / 81.873, -40.202, 4.630,
               -40.202, 20.900, 2.514,
               4.630, -2.514, 0.314 /
DATA      m(:,:,5) / 89.497, 35.213, 3.257,
               -35.213, 14.621, -1.409,
               3.257, -1.409, 0.141 /
DATA      m(:,:,6) / 95.091, -31.207, 2.411,
               -31.207, 10.786, -0.867,
               2.411, -0.867, 0.072 /
DATA      m(:,:,nfls)/99.340, -27.966, 1.855,
               -27.966, 8.279, -0.571,
               1.855, -0.571, 0.041 /
DO j = 0, 2*ifl
  yy = pwr_in(j)
  IF( yy.GT.0. )ThEN
      y_dB(j) = 10. * LOG10( yy )
  ELSE
      y_dB(j) = 0.
  ENDIF
ENDDO
DO i = 1, 3
  y(i) = 0.
  DO j = 0, 2*ifl
    y(i) = y(i) + weight(j,ifl)**2* j**(i-1) * y_dB(j)
  ENDDO
ENDDO
DO 1 = 1,3
  x(i) = .
  DO j = 1,3
    x(l) = x(l) +y(l) * m(l,j,ifl)
  ENDDO
ENDDO
mantiza = x(2)*x(2) - 4 *x(1)*x(3)
IF( mantiza.GE. 0.)THEN
  GET_WIDTH_N = SQRT( mantiza) / x(3)
ELSE
  GET_WIDTH_N = 0.
ENDIF
RETURN
END
```

What is claimed is:

1. A method of removing returns from rain in Doppler radar systems, the method comprising the steps of:

receiving a Doppler radar return signal;

transforming the signal into a range versus frequency map;

for a plurality of range cells, performing a fit over frequency;

for the plurality of range cells, calculating a total energy;

for the plurality of range cells, comparing the calculated total energy to a threshold value; and replacing the return signal for a range cell with another signal if for the plurality of range cells the comparing step is positive.

2. The method of claim 1 wherein the plurality of range cells are adjacent.

3. The method of claim 1 wherein the plurality of range cells comprise at least three.

4. The method of claim 1 wherein in the replacing step the another signal is a noise signal.

5. The method of claim 4 wherein the noise signal is statistically similar to an average energy proximate the plurality of range cells.

6. The method of claim 1 wherein the transforming step comprises performing a Fast Fourier Transform.

7. The method of claim 1 wherein the method is implemented in a system selected from the group consisting of military targeting systems, helicopter identification systems, and airport aircraft location systems.

8. The method of claim 1 wherein the step of performing a fit comprises performing a least squares fit.

9. The method of claim 7 wherein the step of performing a fit comprises performing a parabolic least squares fit.

10. The method of claim 8 wherein the step of performing a fit comprises performing a parabolic Gaussian weighted least squares fit.

11. The method of claim 1 additionally comprising the step of averaging frequency data across the plurality of range cells prior to the step of performing a fit.

12. The method of claim 11 wherein the averaging step comprises employing a non-weighted running carriage integral method.

13. The method of claim 1 wherein the calculating step comprises integrating a power spectrum.

14. The method of claim 13 wherein the calculating step comprises calculating signal power and noise power simultaneously.

15. The method of claim 1 wherein in the comparing step the threshold value is predetermined.

16. The method of claim 15 wherein the threshold value is approximately 14 dB.

17. An apparatus for removing returns from rain in Doppler radar systems, said apparatus comprising:

means for receiving a Doppler radar return signal;

means for transforming the signal into a range versus frequency map;

for a plurality of range cells, means for performing a fit over frequency;

for said plurality of range cells, means for calculating a total energy;

for said plurality of range cells, means for comparing the calculated total energy to a threshold value; and means for replacing the return signal for a range cell with another signal if for said plurality of range cells results of comparing are positive.

18. The apparatus of claim 17 wherein said plurality of range cells are adjacent.

19. The apparatus of claim 17 wherein said plurality of range cells comprise at least three.

20. The apparatus of claim 17 wherein in said replacing means the another signal is a noise signal.

21. The apparatus of claim 20 wherein said noise signal is statistically similar to an average energy proximate said plurality of range cells.

22. The apparatus of claim 17 wherein said transforming means comprises means for performing a Fast Fourier Transform.

23. The apparatus of claim 17 wherein said apparatus comprises a system selected from the group consisting of military targeting systems, helicopter identification systems, and airport aircraft location systems.

24. The apparatus of claim 17 wherein said means for performing a fit comprises means for performing a least squares fit.

25. The apparatus of claim 24 wherein said means for performing a fit comprises means for performing a parabolic least squares fit.

26. The apparatus of claim 25 wherein said means for performing a fit comprises means for performing a parabolic Gaussian weighted least squares fit.

27. The apparatus of claim 17 additionally comprising means for averaging frequency data across said plurality of range cells prior to operation of said means for performing a fit.

28. The apparatus of claim 27 wherein said averaging means comprises means for performing a non-weighted running carriage integral method.

29. The apparatus of claim 17 wherein said calculating means comprises means for integrating a power spectrum.

30. The apparatus of claim 29 wherein said calculating means comprises means for calculating signal power and noise power simultaneously.

31. The apparatus of claim 17 wherein said threshold value is predetermined.

32. The apparatus of claim 31 wherein said threshold value is approximately 14 dB.

33. Computer software for removing returns from rain in Doppler radar systems, said computer software comprising:

means for transforming a Doppler radar return signal into a range versus frequency map;

for a plurality of range cells, means for performing a fit over frequency;

for said plurality of range cells, means for calculating a total energy;

for said plurality of range cells, means for comparing the calculated total energy to be a threshold value; and means for replacing the return signal for a range cell with another signal if for said plurality of range results of comparing are positive.

* * * * *